No. 621,243. Patented Mar. 14, 1899.
W. A. GILDAY.
BICYCLE TIRE.
(Application filed June 1, 1897.)
(No Model.)
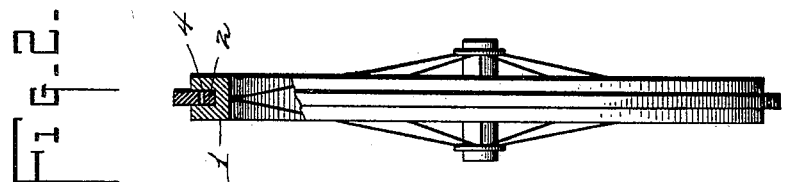
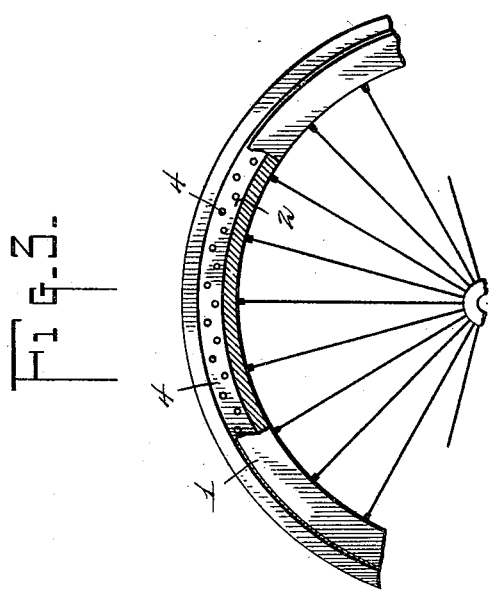
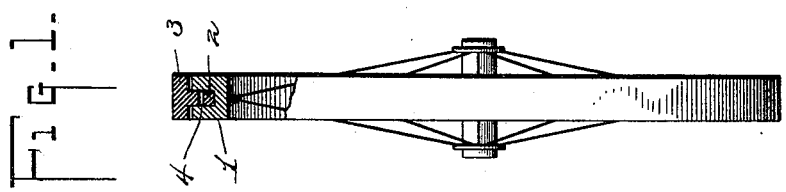
Witnesses
Harry L. Ames.
C. N. Walker.
Inventor
William A. Gilday.
by O. D. Stockbridge.
his Attorney.

UNITED STATES PATENT OFFICE.

WILLIAM A. GILDAY, OF PHILADELPHIA, PENNSYLVANIA.

BICYCLE-TIRE.

SPECIFICATION forming part of Letters Patent No. 621,243, dated March 14, 1899.

Application filed June 1, 1897. Serial No. 638,835. (No model.)

*To all whom it may concern:*

Be it known that I, WILLIAM A. GILDAY, of Philadelphia, in the county of Philadelphia and State of Pennsylvania, have invented certain new and useful Improvements in Bicycle-Tires; and I do hereby declare the following to be a full, clear, and exact description of the invention, such as will enable others skilled in the art to which it appertains to make and use the same.

This invention relates to improvements in bicycle-tires; and it consists, essentially, in the combination of an annularly-grooved wheel-rim and a band or tire having a web adapted to fit in the groove in the wheel-rim, the tire being perforated laterally in staggered rows, so that it will yield opposite substantially all points of its circumference.

In the drawings forming a part of this specification, Figure 1 is a section through the rim of a wheel, showing the groove and a T-shaped tire made from rubber or other like resilient substance. Fig. 2 is a similar section showing the tire made of a plain web fitted into the groove in the rim. Fig. 3 is a side elevation of a segment of the wheel, part of the rim being broken away to show the perforated tire in elevation.

1 is the rim of a wheel provided with an annular groove having parallel side walls, as shown.

2 is the web portion of the tire or band of uniform thickness throughout, which fits in the groove. As shown in Fig. 1, the tire is provided with a web portion and with a T-shaped head or flat portion 3. The web is provided with a series of rows of perforations 4 4, arranged in alternate or staggered order, so that in use it will yield or become compressed within the groove in the rim opposite any part of its periphery. The form of tire shown in Fig. 1 is best adapted for the rear or driving wheel of a bicycle, while the form shown in Fig. 2 serves a good purpose for the front or guide wheel of a bicycle.

Having thus described my invention, what I claim as new, and desire to secure by Letters Patent, is—

1. The combination of a wheel-rim provided with an annular groove having parallel side walls, and a tire having a perforated web of uniform thickness adapted to fit within said groove, substantially as described.

2. A bicycle-tire consisting of rubber or other like substance, having a broad tread, and a web of uniform thickness provided with a series of rows of lateral perforations arranged in alternate or staggered order, substantially as described.

In testimony whereof I have signed this specification in the presence of two subscribing witnesses.

WILLIAM A. GILDAY.

Witnesses:
WILLIAM WOOD,
WM. F. PADDOCK.